(12) United States Patent (10) Patent No.: US 7,594,164 B2
Hoche et al. (45) Date of Patent: Sep. 22, 2009

(54) METHOD, A HYPERMEDIA COMMUNICATION SYSTEM, A HYPERMEDIA SERVER, A HYPERMEDIA CLIENT, AND COMPUTER SOFTWARE PRODUCTS FOR ACCESSING, DISTRIBUTING, AND PRESENTING HYPERMEDIA DOCUMENTS

(75) Inventors: Michael Walter Hoche, Schwieberdingen (DE); Peter Szabo, Pforzheim (DE); Horst Rössler, Filderstadt (DE)

(73) Assignee: ALCATEL, Paris (FR)

( * ) Notice: Subject to any disclaimer, the term of this patent is extended or adjusted under 35 U.S.C. 154(b) by 751 days.

(21) Appl. No.: 10/893,296

(22) Filed: Jul. 19, 2004

(65) Prior Publication Data

US 2005/0027677 A1 Feb. 3, 2005

(30) Foreign Application Priority Data

Jul. 31, 2003 (EP) .................................. 03291938

(51) Int. Cl.
*G06F 17/00* (2006.01)
*G06F 7/00* (2006.01)
*G06F 15/16* (2006.01)

(52) U.S. Cl. ............................ 715/205; 715/203; 707/1; 707/104.1; 709/203; 709/217

(58) Field of Classification Search .............. 715/500.1, 715/501.1, 500, 730, 200–205, 234, 716, 715/717, 719, 723, 210, 240, 255, 273, 738, 715/751, 760, FOR. 178, FOR. 185; 707/1, 707/104.1, E17.013; 709/201, 202, 203, 709/217, 219, 223, 226

See application file for complete search history.

(56) References Cited

U.S. PATENT DOCUMENTS 5,748,187 A * 5/1998 Kim et al. .................... 715/201
5,884,301 A    3/1999 Takano
6,141,001 A * 10/2000 Baleh ......................... 715/203

(Continued)

FOREIGN PATENT DOCUMENTS

EP    0 788 063 A2    8/1997

(Continued)

OTHER PUBLICATIONS

Benitez et al., "Object-based multimedia content description schemes and applications for MPEG-7", Signal Processing: Image Communication Elsevier Science Publishers, Amsterdam, NL, vol. 16, No. 1-2, Sep. 2000, pp. 235-269, XP004216278.*

(Continued)

*Primary Examiner*—Laurie Ries
*Assistant Examiner*—Maikhanh Nguyen
(74) *Attorney, Agent, or Firm*—Sughrue Mion, PLLC

(57) ABSTRACT

Provided is a method for a hypermedia communication system including: the steps of generating a hypermedia by presenting the hypermedia in a hypermedia description at a hypermedia server; requesting the hypermedia at a hypermedia client; deploying the hypermedia description from the server to the hypermedia client; and presenting the hypermedia by translating the hypermedia description. The hypermedia description includes expression means for a reference from an atemporal hypermedia object to a referred hypermedia object. The method also includes the steps of generating, requesting, deploying, and presenting hypermedia, uniformly, using a hypermedia description including further expression means for a reference from a temporal hypermedia object to a referred hypermedia object.

5 Claims, 14 Drawing Sheets

U.S. PATENT DOCUMENTS

| | | | |
|---|---|---|---|
| 6,411,724 | B1 | 6/2002 | Vaithilingam et al. |
| 6,621,939 | B1 * | 9/2003 | Negishi et al. ............... 382/291 |
| 6,631,403 | B1 * | 10/2003 | Deutsch et al. ............. 709/217 |
| 6,727,955 | B2 * | 4/2004 | Pereboom ................... 348/468 |
| 7,039,633 | B1 * | 5/2006 | Dey et al. ....................... 707/3 |
| 7,051,272 | B1 * | 5/2006 | Ten Kate ................. 715/501.1 |
| 7,185,049 | B1 * | 2/2007 | Benitez et al. .............. 709/203 |
| 2004/0015501 | A1 * | 1/2004 | Anonsen et al. ............... 707/10 |
| 2004/0015542 | A1 * | 1/2004 | Anonsen et al. ............ 709/203 |
| 2004/0201609 | A1 * | 10/2004 | Obrador ..................... 345/723 |
| 2004/0267720 | A1 * | 12/2004 | Liu et al. ........................ 707/3 |
| 2006/0256130 | A1 * | 11/2006 | Gonzalez ................... 345/619 |

FOREIGN PATENT DOCUMENTS

| | | |
|---|---|---|
| EP | 0 828 368 A1 | 3/1998 |
| WO | WO 02/05089 A1 | 1/2002 |

OTHER PUBLICATIONS

Choi et al., "Distributed Multimedia Presentation System Based on the MHEG", Information Networking, IEEE, Jan. 1998, pp. 403-406.*

Kretz et al., "Standardizing Hypermedia Information Objects", Communication Maganize, IEEE, 1992, pp. 60-70.*

Oh et al., "Experiments with MHEG Player/Studio: An Interactive Hypermedia Visualization and Authoring System", IEEE, pp. 610-615.*

Nazareno Maia Sampaio, "Enabling Temporal Synchronization in E-LOTOS Specifications and MHEG-5 Application", IEEE, Nov. 1997, pp. 92-100.*

Building Applications Frameworks Chapter 11 "Capturing Hypermedia Functionality," 1997, pp. 267-287.*

Colaitis et al., "MHEG: An Emerging Standard for The Interchange Of Multimedia and Hypermedia Objects," IEEE, May 1993, pp. 542-546.*

S. Boll et al., "ZyX—A Multimedia Document Model for Reuse and Adaptation of Multimedia Content", IEEE Transactions on Knowledge and Data Engineering, vol. 13, No. 3, May/Jun. 2001, pp. 361-382.*

R. Willrich et al., "A Formal Framework for the Specification, Analysis and Generation of Standardized Hypermedia Documents", Multimedia Computing and Systems, IEEE, Jun. 1996, pp. 399-406.*

T. Meyer-Boudnik et al., "MHEG Explained", IEEE, vol. 2, Issue 1, Spring 1995, pp. 26-38.*

A. Chakraborty, P. Lui, L. Hsu: "Authoring and Viewing Video Documents using an SGML structure" Internet Article, 'Online! Jun. 1, 1999, pp. 1-6, XP002268291.

* cited by examiner

METHOD, A HYPERMEDIA COMMUNICATION SYSTEM, A HYPERMEDIA SERVER, A HYPERMEDIA CLIENT, AND COMPUTER SOFTWARE PRODUCTS FOR ACCESSING, DISTRIBUTING, AND PRESENTING HYPERMEDIA DOCUMENTS

TECHNICAL FIELD

The present invention relates to accessing, distributing, and presenting hypermedia documents. In particular the invention relates to a method, a hypermedia communication system, a hypermedia server, a hypermedia client, and computer software products.

The invention is based on a priority application, EP 03291938.3, which is hereby incorporated by reference.

BACKGROUND OF THE INVENTION

Hypermedia, a term derived from hypertext, extends the notion of the hypertext link to include links among any set of multimedia objects, including sound, motion video, and virtual reality. It also connotes a higher level of user/network interactivity than the interactivity already implicit in hypertext.

Hypermedia is currently realized as a set of computer-addressable files that contain pointers for linking to multimedia information, such as text, graphics, video, or audio. The use of hypertext links is known as navigating. One of the emerging important media types are temporal multimedia objects, i.e. continuous or transient media like motion pictures, audio, morphing objects etc. adding a further information dimension: time.

These media types require certain computational, networking, and storage resources. MPEG (pronounced M-peg), which stands for Moving Picture Experts Group, is a family of standards used for coding audio-visual information in a digital compressed format.

MPEG-4 addresses coding of digital hybrids of natural and synthetic, aural and visual (A/V) information. The objective of this hybrid coding (SNHC) is to facilitate content-based manipulation, interoperability, and wider user access in the delivery of animated mixed media.

Trends in networking, in decentralization of media production and consumption, and in computer graphics point toward changes in distributing passive and interactive mixed media. Audio/video and 2D/3D synthetic graphics are merging into hybrid compositions in a variety of formats and platforms that extend the role of television and the PC. This evolution widely spans lower-bit-rate applications like video cellular telephony, and higher-bandwidth, networked, interactive, real-time media experiences like distance learning, gaming, and training.

There are two multimedia object categories: the temporal transient ones with timing constraints and the atemporal ones, i.e. the persistent objects. When these objects refer each other, i.e. are in relation, they are called hypermedia objects. The relation as well as the object and their properties are denoted using a hypermedia description (language).

Emerging silicon and software systems are moving toward delivery of hybrid content for real-time experiences with a high level of integration of computing resources, algorithms, and data primitives to decode, animate, render, and composite scenes. A/V objects can exist as transient or stored data in channels and media such as the Internet, ATM/BISDN communications, CD-ROM, on-line modifiable disks that page active data, archival digital libraries, and the memories of servers, decoders, PCs, graphics accelerators, and newer media processors.

Various modeling schema for spatial and temporal media content are embodied in current work such as VRML 2.0 (Virtual Reality Modeling Language), Java Media 2D,/3D, and ActiveX Animation. MPEG-4 is concerned with coding of animated data, and thus with spatial-temporal relationships among A/V objects as represented in bit-streams. The requirements of MPEG-4 are so complex that bit-streams and the higher-level representations they encode are designed in isolation from the application environment.

Several other cross platform video and audio standards have been established e.g. JPEG (Joint Photographic Experts Group), and a number of different MPEG standards.

On the other hand MHEG (Multimedia and Hypermedia Experts Group) is a multimedia presentation standard to provide a framework for multimedia applications, to define a digital final form for presentations, which may be used for exchange of the presentations between different machines or platforms, to provide extensibility.

MHEG defines the abstract syntax through which presentations can be structured. This is the definition of data structures and the fields in those data structures, through which two computers may communicate.

The MHEG model is object orientated, and defines a number of classes from which object instances are created when a presentation is designed. There are several classes, and these are used to describe the way video is displayed, audio is reproduced, and how the user can interact with the ongoing presentation. The relationship that is created between instances of these classes forms the structure of the presentation. There are several different types of class in the MHEG model, e.g. content classes or behavior classes, action classes, link classes, user input classes etc.

The separation of underlying techniques (due to their complexity) yields to an unfortunate separation of media description in a multimedia hypermedia document.

As in the case for coding, several other cross platform multimedia standards have been established e.g. the well known hypertext markup language (HTML) or meta descriptions like Standard Generalized Markup Language (SGML) or Extensible Markup Language (XML).

Linked content can be in different formats: text, HTML, images, video or audio, slides and many others. Content standards depend mostly on the plug-ins running on the user's browser, going images to complex media formats (mp3, wave, midi, Real Player).

Technically, the enrichment process does not affect the temporal media like video, since the link structure is described independently. At a conceptual level a hyper-video is the aggregation of a digital video and the linked informative structure. Technically it is realized by the original video decorated with (synchronized) links in a separate (enveloping) description.

Two specifications are vying to be the baseline protocol for multimedia exchange. The first is commonly known as MHEG (mentioned above), the second is DVB-MHP (digital video broadcast multimedia home platform).

ISO defines a family of MHEG standards, from MHEG-1 to MHEG-7, that allow multimedia objects to be distributed in a client-server architecture across a variety of platforms. MHEG-5 is a streamlined, application-specific version of MHEG-1 that embeds an MHEG boot application in the MPEG-2 stream. The boot application is a self-contained interpreting media object.

The DVB-MHP spec inserts an abstraction layer between applications and digital TV terminals. This allows applications to be carried over any compliant network, be it cable, terrestrial, or satellite, to a wide range of terminal types.

A typical DVD-MHP software architecture comprises MHP applications, called Xlets, are typically written in Java and compiled by the extensive range of Java classes defined in the MHP specification. The heart of the MHP is the application manager, which controls the full life cycle of Xlets, several of which can run concurrently.

A hypermedia communication system comprising a client computer, server computers for holding contents files, and a directory server computer for intensively managing information about the contents files is e.g. known from U.S. Pat. No. 5,884,301. These computers are connected via a network.

Current visual telecommunication applications provide on demand a streamed file exchange, i.e. a server provides a set of more or less unlinked temporal media objects, e.g. using uniform resource identifiers. A client can request and retrieve e.g. a streamed motion picture embedded in an environment that might decorate the motion picture by further uniform resource identifieres (URIs).

Such a realization of a visual telecommunication application is described in European Patent Application No. 0 828 368 A1.

The problem to be solved is that for continuous temporal media objects like video within a hypermedia description it is not possible to refer, link, embed or relate to other hypermedia resources using the known techniques. This results in a morphological break and temporal media could not be treated as hypermedia.

This problem is targeted using a hypermedia description comprising expression means for a relation from a temporal hypermedia object to a referred hypermedia object.

The problem is solved by a method for a hypermedia communication system comprising the steps of generating a hypermedia by presenting the hypermedia in a hypermedia description at a hypermedia server (e.g. based on a file or dynamically from external resources)

requesting the hypermedia at a hypermedia client deploying the hypermedia description from the server to said client presenting the hypermedia by translating the hypermedia description where said hypermedia description comprising expression means for a reference from an atemporal hypermedia object to an other hypermedia objects, the hypermedia description comprising further expression means for a reference from a temporal hypermedia object to a hypermedia object.

This problem is solved, inter alia, by a hypermedia communication system comprising a hypermedia server and a hypermedia client, the hypermedia client comprises transmission means for requesting and receiving a hypermedia object from the hypermedia server, the hypermedia server comprises transmission means for providing on request a hypermedia object to the hypermedia client, and the hypermedia client comprises presentation means for presenting said multimedia object, the hypermedia object comprises a temporal hypermedia object in relation to a referred hypermedia object, the relation being a reference from a temporal hypermedia object to a referred hypermedia object, and the hypermedia client comprises interpretation means and interaction means for interpreting the relation for controlling the presentation and the transmission means.

And the problem is solved by a hypermedia server comprising transmission means for providing on request a hypermedia object to a hypermedia client, the hypermedia object comprises a temporal hypermedia object in relation to a referred hypermedia object, the relation is a reference from a temporal hypermedia object to the referred hypermedia object, the hypermedia server comprising interpretation means for interpreting and resolving requests for the referred hypermedia object, retrieval means for retrieving the referred hypermedia object from a hypermedia server, and composition means for integrating or aggregating the referred hypermedia object into the hypermedia object.

The problem is solved correspondingly by a hypermedia client comprising transmission means for requesting and receiving a hypermedia object from a hypermedia server, and presentation means for presenting said multimedia object, the hypermedia object comprises a temporal hypermedia object in relation to a referred hypermedia object, the relation is a reference from the temporal hypermedia object to the referred hypermedia object, and the hypermedia client comprising interpretation means and interaction means for interpreting the relation for controlling the presentation and the transmission means.

And the problem is solved by computer software products for authoring, realizing a hypermedia server, and realizing a hypermedia client.

In other words, when concerning the hypermedia deployment process, server-side interaction initiated by a user action requires back-channel, i.e. a transfer protocol. It further requires a composite multimedia object for temporal and atemporal media and a transfer protocol therefor. The multimedia object relations provides enhanced inter-linking and networking interactivity.

The underlying idea is to reuse the hypertext media techniques, namely document object model, hypertext markup language, hyper text transfer protocol, web-servers and web-browser consequently for continuous transient temporal media like audio or video, in a transient continuous mode.

The underlying idea of the invention is an algebraic concept for describing (temporal) hypermedia. Algebraic hypermedia uses a set of basic operations on which to create a desired hypermedia (stream). The algebra consists of operations for temporally and spatially combining parts, and for attaching attributes to these parts. Parts of interest can be discovered with queries that describe desired attributes. Algebraic hypermedia permits hypermedia expressions to be nested in arbitrarily deep hierarchies. It also permits hypermedia parts to inherit attributes by context.

As digital video becomes ubiquitous and as more video sources become available, applications will need to deal with digital video as a new data type. However, the nature of video information, or in general of temporal media, is different from existing media types such as text, since video has both temporal and spatial dimensions. Moreover, the volume and unstructured format of digital video data make it difficult to manage, access and compose video segments into hypermedia documents.

Many existing digital video abstractions rely on the traditional view of video as a linear temporal medium. They do not take full advantage of either the logical structure of the video or of hierarchical relationships between video segments. Moreover, access based on the structure and its hierarchy is not supported.

An algebraic hypermedia data model enables to
introduce nested hypermedia structures such as shot or scene,
express temporal and spatial compositions of parts,
define output characteristics,
associate content information with logical parts,
provide multiple coexisting views and annotations of the some information,
provide associative access based on the content, structure and temporal information,
specify coordinated multi-stream viewing, and
specifying referential relations like hyper links or embeddings.

The algebraic hypermedia model consists of (hierarchical) compositions of hypermedia expressions with semantic descriptions. The hypermedia expressions are constructed using algebra operations. The hypermedia algebra is a means for combining and expressing temporal or spatial relations, for defining the output characteristics of video expressions, and for associating descriptive information with these expressions. The algebraic abstraction provides an efficient means for organizing, accessing, and manipulating video data by assigning logical representations to the underlying video streams and their contents. The model also defines operations for access to the video information. The output characteristics of video expressions are media-independent, and thus the rendering can adjust to the available resources.

Users can search or navigate through video collections with either queries that describe desired attributes of hypermedia expressions or by exploring the hypermedia model via following relations (navigating). The result of such a query or an exploration might be a set of video expressions that can be played back, reused, or even manipulated by a user or a presentation client.

In addition to content-based access, algebraic video allows browsing. The user can explore the structure of the video expressions to understand the surrounding organization and context. The algebraic hypermedia model allows users and presentation client to compose concurrent video presentations by structuring parts and then describing the (temporal) relations between these segments. Hierarchical relations between the hypermedia expressions allow nested stratification, overlapping segments could be used to provide multiple coexisting views and annotations of the same data and enable the user to assign multiple meanings to the same footage. Parts can be organized so that their relationships are preserved and can be exploited by the user. In addition to simple stratification, the algebraic hypermedia model preserves nested relationships between strata and allows the user to explore the context of a stratum.

The algebraic video data model might provide the fundamental functions required to deal with digital video: composition e.g. bundling (a sheaf) in the topological sense, reuse, organization, searching, and browsing. It models complex, nested logical structure of hypermedia using hypermedia algebra. The hypermedia algebra is a useful metaphor for expressing temporal inter-dependencies between video segments, as well as associating descriptions and output characteristics with video segments. The model allows associative access based on the content of the video, its logical structure and temporal composition.

The fundamental entity of the algebraic hypermedia model is a presentation. A presentation is a multi-window spatial, temporal, and content combination of hypermedia parts. Presentations are described by hypermedia expressions.

The hypermedia algebra operations might be classified into the following categories:
Creation: defines the construction of hypermedia expressions.
Composition: defines temporal and spatial relationships between component part expressions.
Output: defines layout and audio output for hypermedia expressions.
Description: associates content attributes with a hypermedia expression.

The algebra approach further allows to express hyper references, enhancing the normal media to hypermedia. The hyper media algebra defines a document architecture with a consistent interface for different media types and a transition model (behavior) between multimedia objects founded on content based links (hyper references) for atemporal media and for content and time-based dynamic links for temporal media, and intrinsic support for content based access.

SUMMARY OF THE INVENTION

Accordingly, it is an object and advantage of the present invention to provide a framework that enables integrated temporal hypermedia like a hyper-motion-picture-stream.

Another advantage of the present invention is that the infrastructure requirements like the computational power and the network capabilities can cope with the high multimedia requirements. And there are now techniques available for performant mobile video services like universal mobile telephone system (UMTS) video services, being a rich source for (temporal) multimedia objects.

A further advantage of the present invention is that the used technique spreads the network load over time. A continuous media stream could now be broken down into pieces—not by coding and pocketing only, but also by semantically meaningful inter-relationship.

Yet another advantage of the present invention is that the technique provides means for a bunch of attractive applications like interactive video, video sightseeing, etc. The new temporal hypermedia modality is well integrated within current hypermedia.

A further advantage is that referenced media transport is de-coupled allowing enhanced reactivity and might even stipulate a better quality of service.

BRIEF DESCRIPTION OF THE DRAWINGS

The invention is described in detail using the figures, where.

Recent advances in multimedia technology have made multimedia documents commonplace. With the availability of many different media types, applications require new access methods and extended functionality, which are not possible with the text-only counterparts. Existing systems, e.g., the World-Wide Web already integrate heterogeneous multimedia objects within one document.

The exploration methods, originally developed for text documents, do not take into account the additional dimensions associated with multimedia information.

Advanced link management within a refined multimedia document architecture contributes:
- an object-oriented architecture for hypermedia documents which allows for (temporally and spatially) coordinated transitions between multimedia objects in a consistent manner
- relationships (links or references) between any multimedia object type.

Static links parameterize transitions only by contents and for any type of object. These are already widely used in e.g. the World Wide Web. For objects with a temporal dimension, e.g., audio, video dynamic links are introduced in order to parameterize transitions by contents and time. To represent a hypermedia document with dynamic links the inter-linking structure is extended to accommodate the additional temporal dimension.

For each hyper media communication system one can focus on two characteristics: the media types of entities the system operates with, and the transitions between related entities. In each case, the behavior is illustrated in a transition diagram representing different entries as class symbols and the transitions between them as arrows.

DETAILED DESCRIPTION OF THE INVENTION

Figure 1:
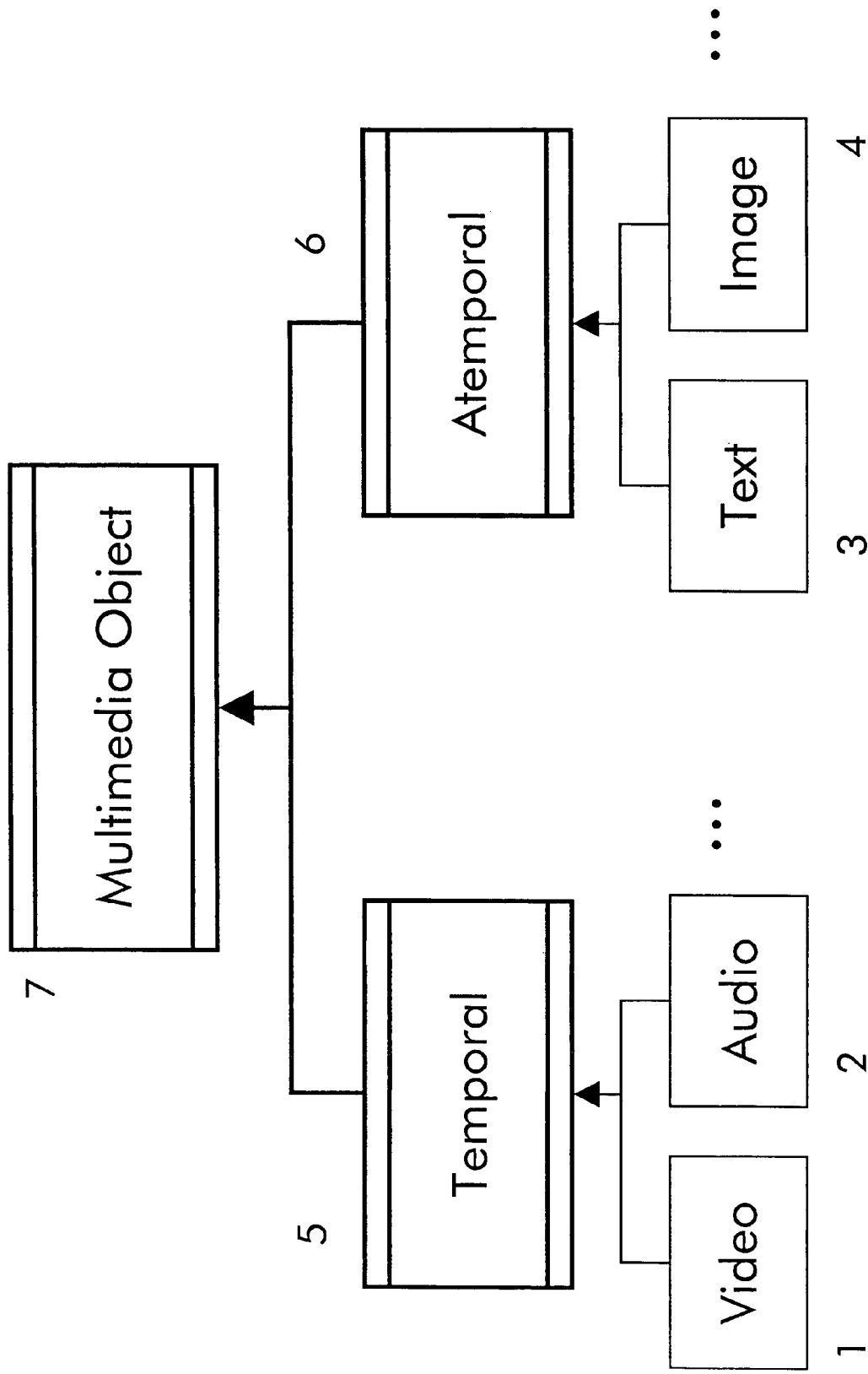
FIG. 1 shows a class diagram of multimedia objects according to prior art.

FIG. 1 shows a simplified prior art multimedia class architecture. There are several media objects, namely video 1, audio 2, text 3, and image 4. Video 1 and audio 2 are temporal media 5; text 3 and image 4 are atemporal media 6. All these object should inherit the properties of a multimedia object 7.

Figure 2:
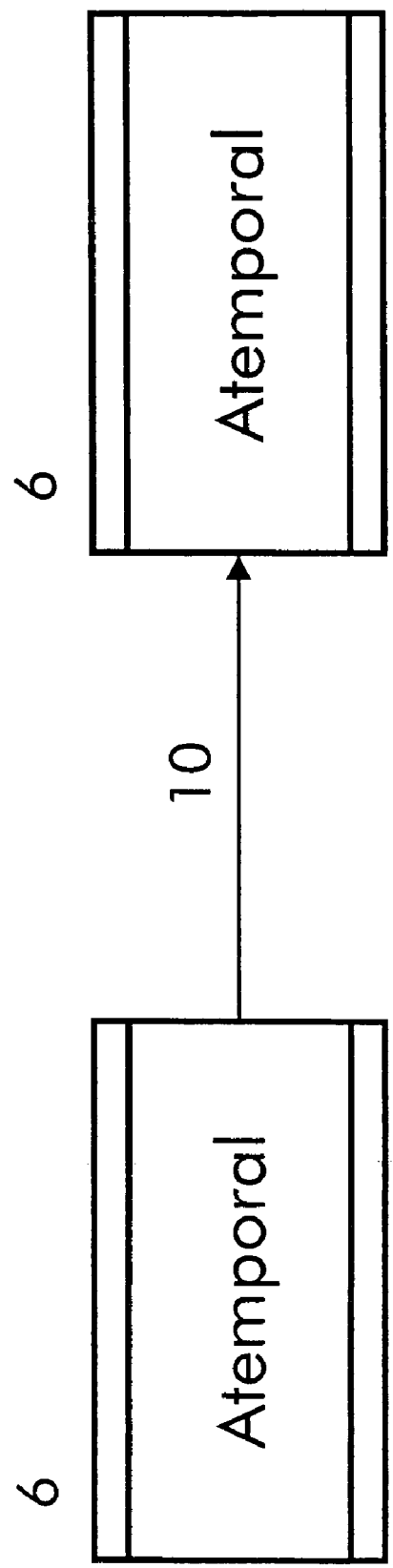
FIGS. 2 and 3 show hypermedia transition models according to prior art.

A basic property of a multimedia object is a relation, e.g. a reference or a hyperlink to another multimedia object. Such a relation 10 between atemporal objects 6 is shown in FIG. 2. FIG. 2 shows e.g. the transition diagram for plain hypertext.

Figure 3:
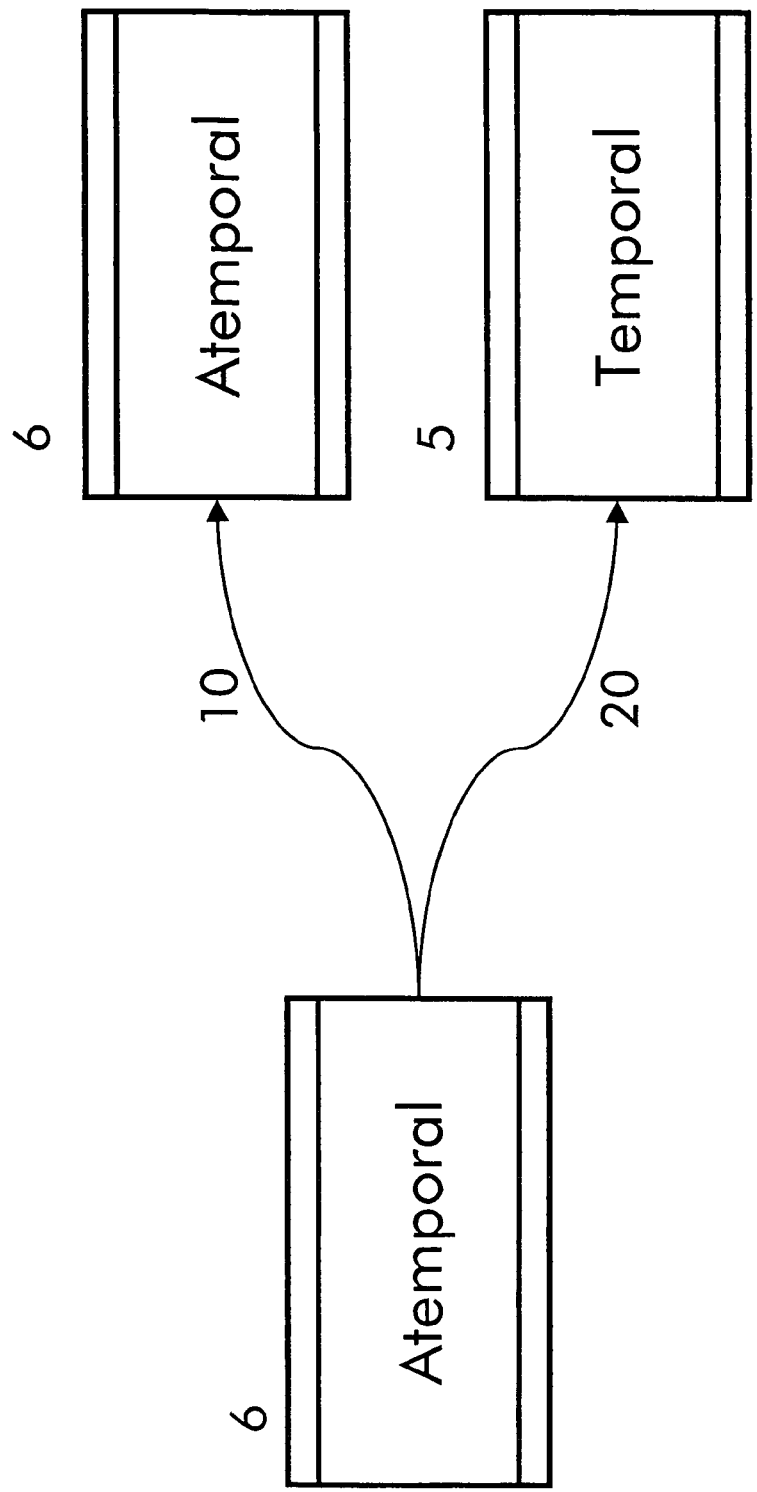

FIG. 3 shows the transition diagram according to prior art. Atemporal objets 6 might either have a relation 10 to atemporal objects 6 or even have a relation 20 to temporal objects 5, as it is in the case of web pages e.g. referring to a trailer.

Figure 4:
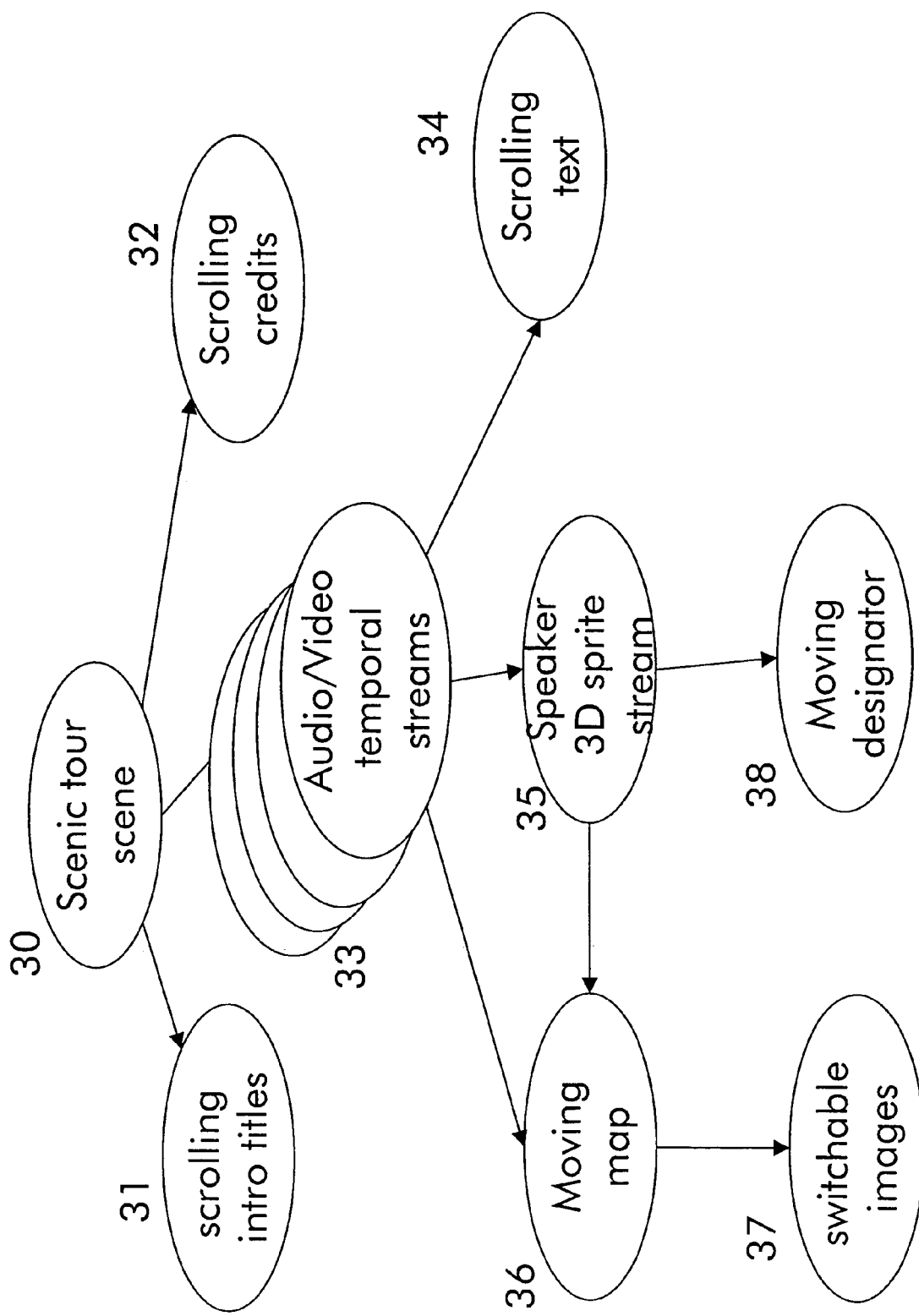
FIG. 4 shows a possible hypermedia model of a scenic tour multimedia document according to prior art.

FIG. 4 shows a sample hypermedia document structure. A scenic tour scene 30 has scrolling intro titles and scrolling credits. In between there are audio/video streams 33 in several versions e.g. resolutions, comprising a scrolling text 34, a speaker sprite stream 35, and a moving map 36. The moving map consists of switchable images. And the speaker sprite stream is controlled by a moving designator 38. The sample application could be implemented e.g. in MPEG-5 within one file or media stream. Then inter-linking via the map and constraints like the speakers text is not coordinated with the media stream but in the viewer application. The figure illustrates the hyper-structure of continuous media. Each related part has especially to be synchronized.

Figure 5:
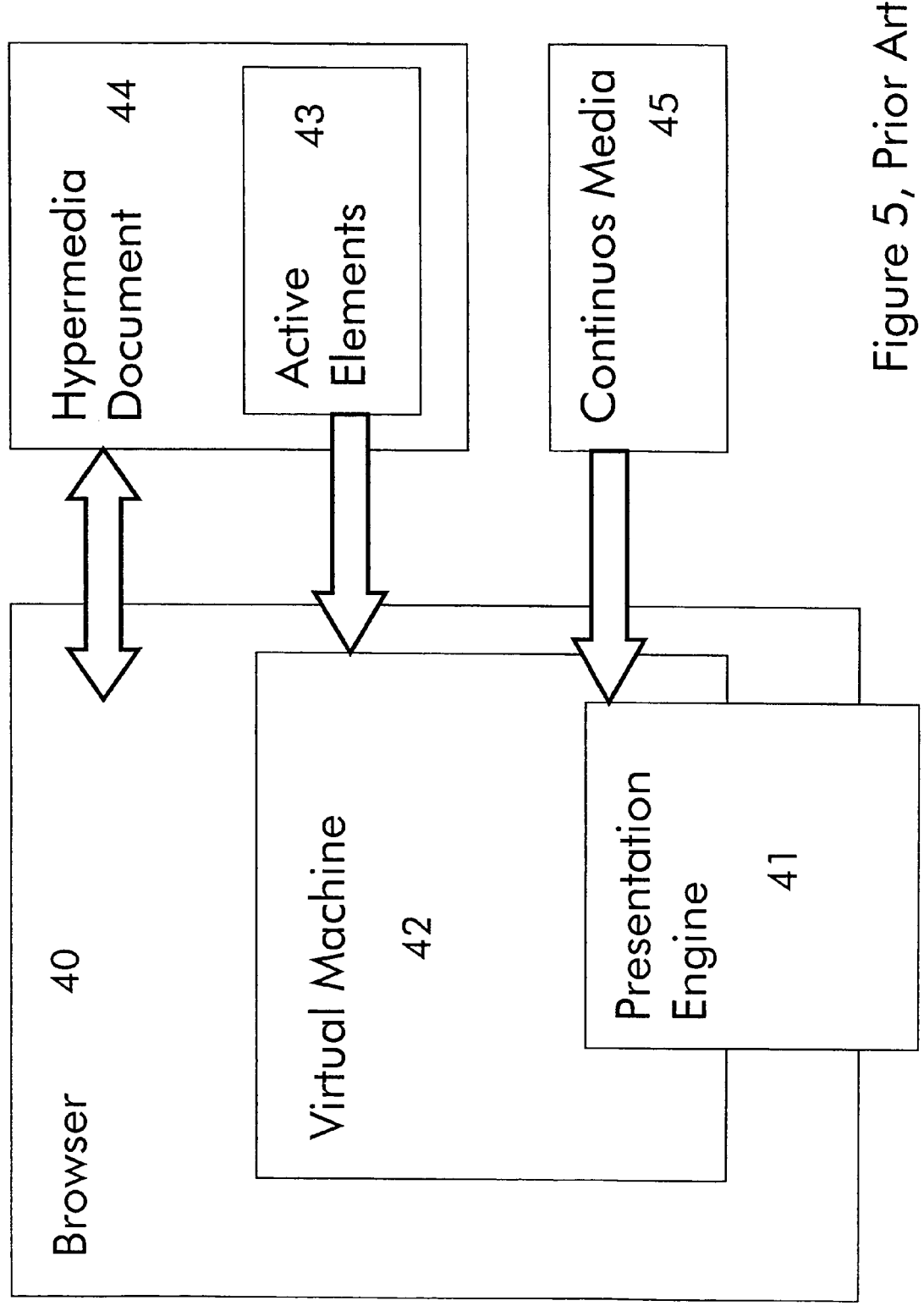
FIG. 5 shows a hypermedia client according to prior art.

The existing World Wide Web browsing systems that embed continuous video media, e.g. by plug-ins into browsers, are shown in FIG. 5. A browser 40 has an integrated or external presentation engine 41, e.g. a media player, and the browser 40 usually comprises a virtual machine 42, e.g. a Java virtual machine for interpreting active elements 43 of a hypermedia document 44. The hypermedia document consisting of the static atemporal parts is usually separated from the continuous (temporal) media 45.

Figure 6:
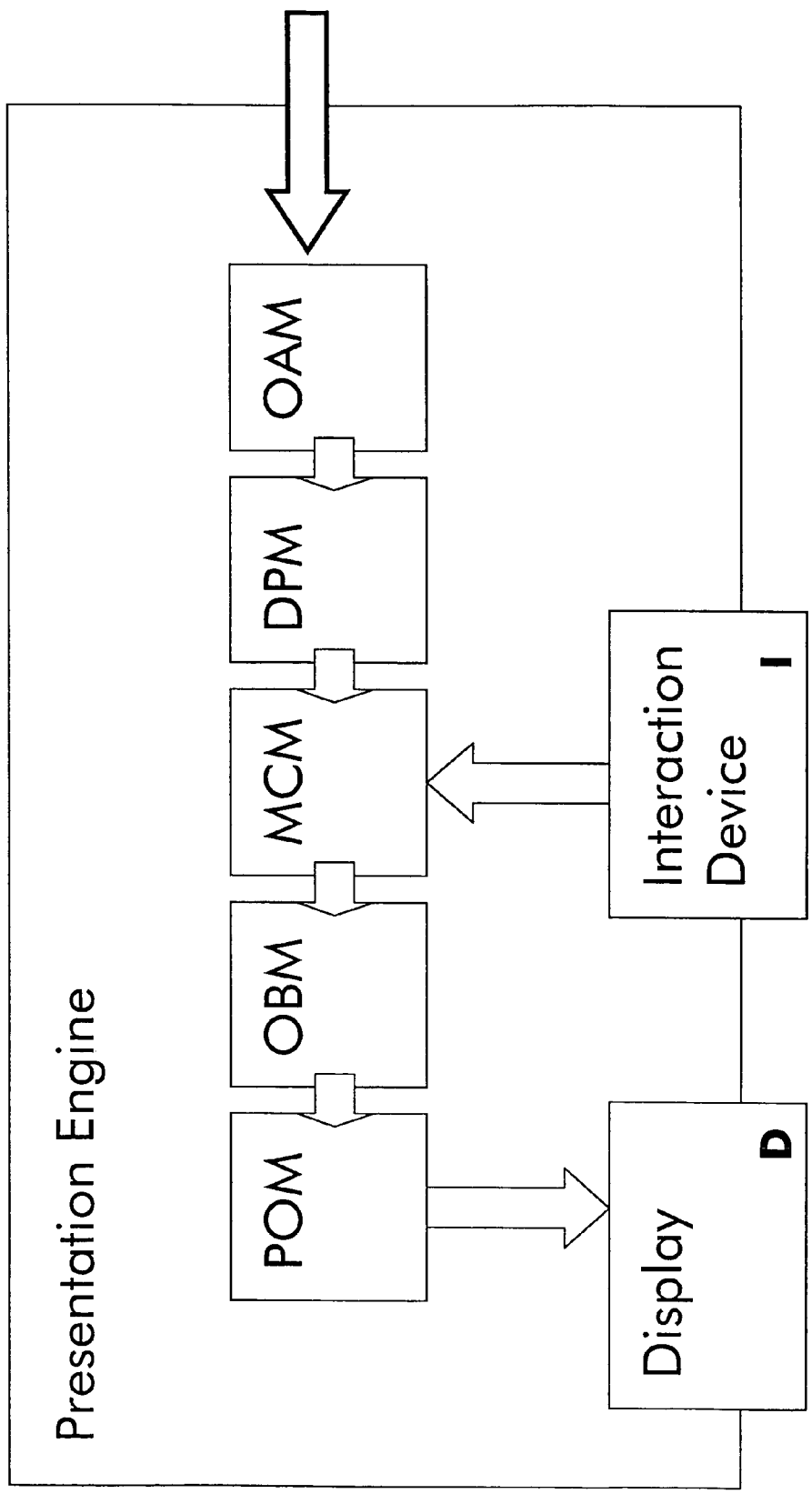
FIG. 6 shows a presentation engine of a hypermedia client according to prior art.

FIG. 6 shows a presentation engine, e.g. an MHEG engine, in detail. An object access module OAM received the media classes. The decode and parse module DPM extracts the media classes for the media core module MCM. The media core module MCM controls the object modules OBM handling the instances of the media and controlling the presentation object module POM. The presentation object module drives the emitting devices like a display D. The media control module also listens to the interaction devices l for interpreting the user interactions on the media objects.

Figure 7:
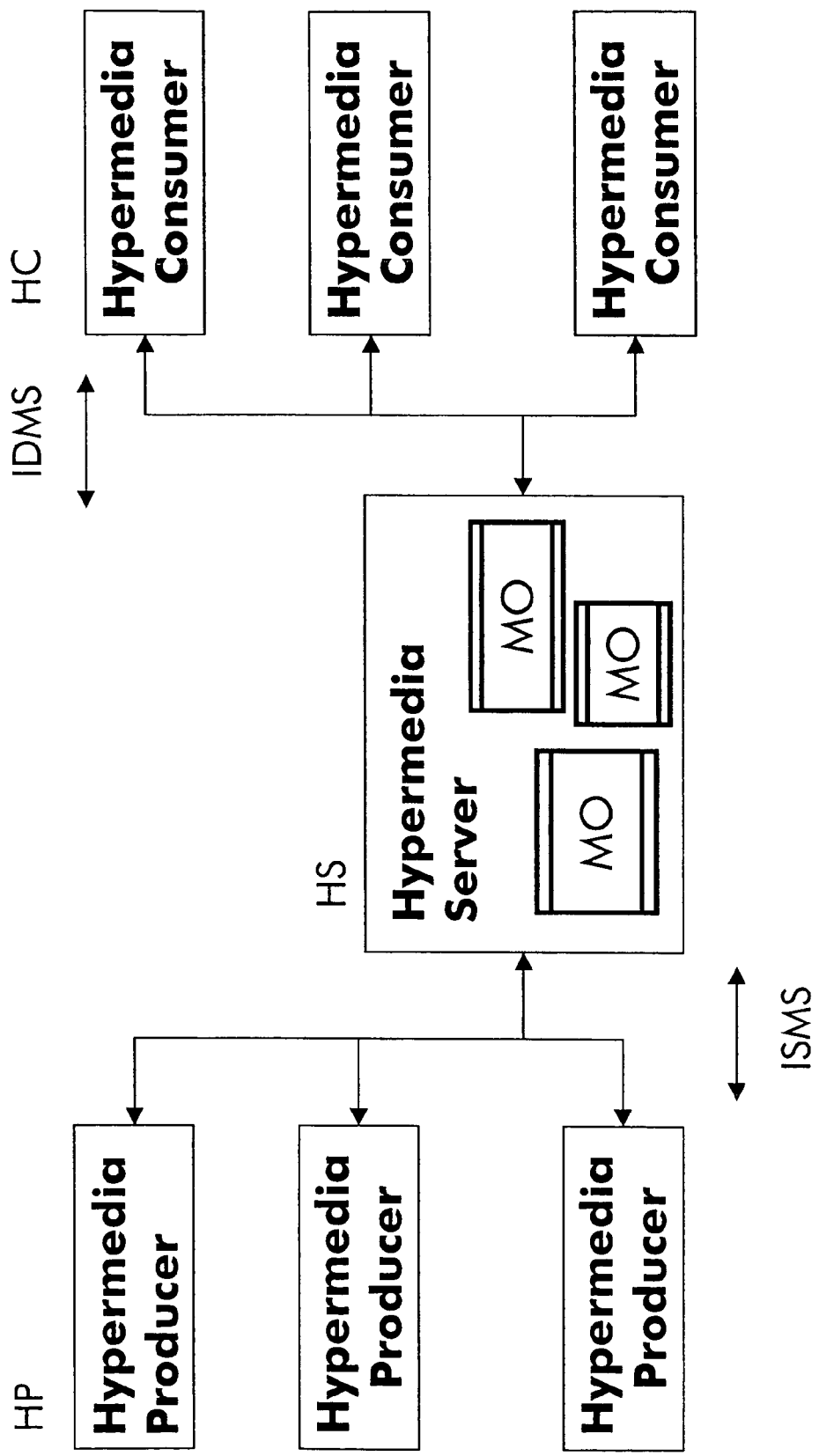
FIG. 7 shows a hypermedia communication system according to the invention.

FIG. 7 shows a hypermedia communication system according to the invention. The figure comprises a hypermedia server HS, several hypermedia producers HP, and several hypermedia consumers HC. The hypermedia server HS organizes, coordinates, integrates, and stores multimedia objects MO. The multimedia objects MO are supported interactively by hypermedia producer HP which might be itself hypermedia servers. Hypermedia consumers HC are connected to the hypermedia server HS enabling an interactive transfer of multimedia objects.

The hypermedia communication system architecture coordinates the communication between hypermedia server HA and hypermedia producer HP by a transfer protocol to support interactive source media streams ISMS. Analogously, a transfer protocol between the hypermedia consumer HC and the hypermedia server HS should support interactive demand media streams IDMS. The architecture is similar to the one comprising a web client and a web server which communicate via hypertext transfer protocol (http).

Figure 8:
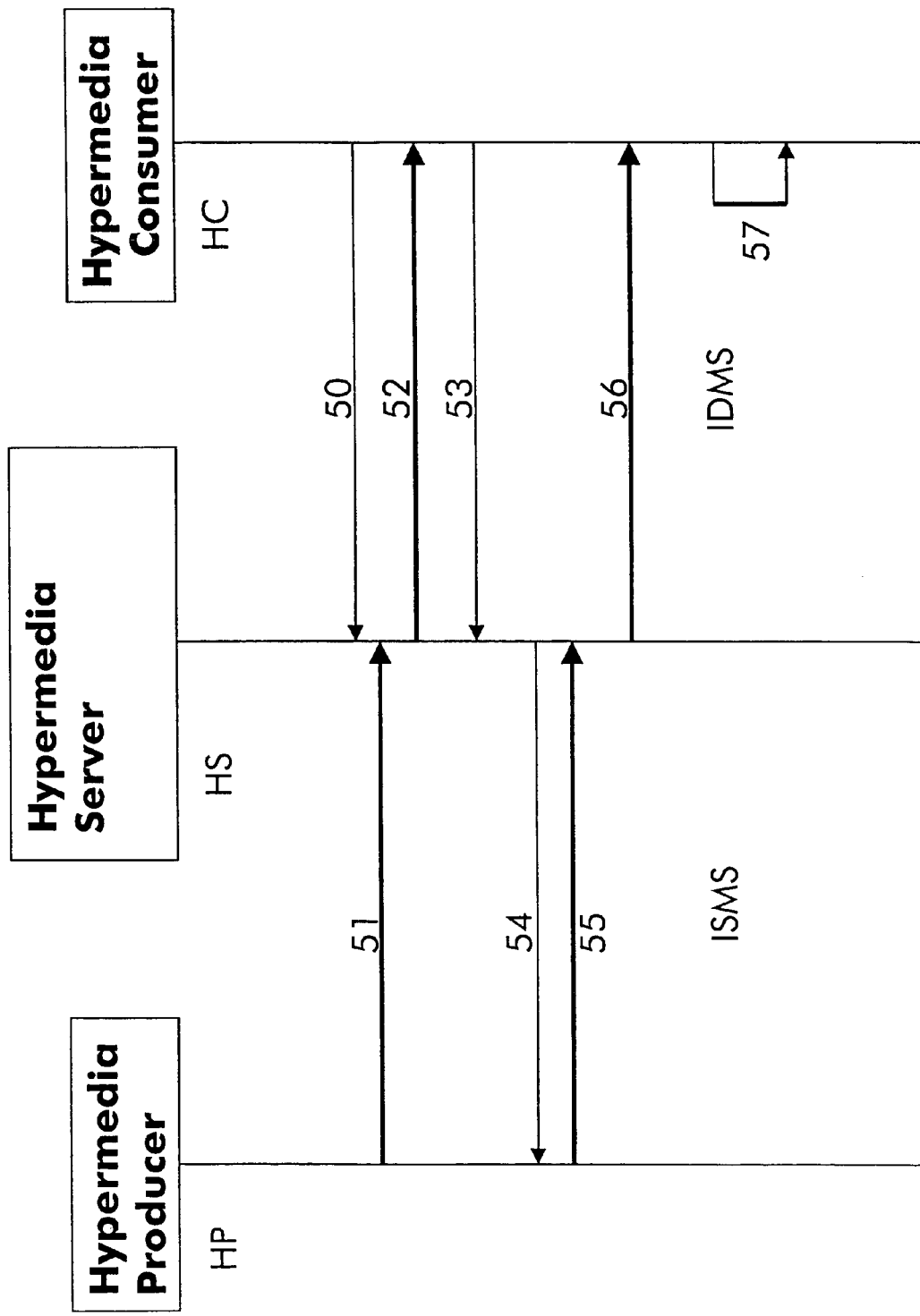
FIG. 8 shows a sequence diagram illustrating the transfer protocols used in the hypermedia communication system according to the invention.

FIG. 8 shows a coarse interaction diagram of the above mentioned transfer protocols ISMS and IDMS. A hypermedia consumer HC requests 50 a hypermedia resource from a hypermedia server HS. This resource is supported 51 by a hypermedia producer HP. The hypermedia server HS resolves the request by providing 52 the resource to the hypermedia consumer HC. The hypermedia consumer HC raises a further request 53, e.g. on a related hypermedia resource. This resource is not available, and the hypermedia server HS requests 54 itself this resource from the hypermedia producer HP. The hypermedia producer answers 55 with the hypermedia resource, the hypermedia server HS processes the result and resolves 56 the hypermedia consumers request. The next request 57 could even be resolved by the hypermedia consumer itself, e.g. by presenting cashed information. Bold faced arrows illustrate the continuous data streams for temporal hypermedia objects.

Figure 9:
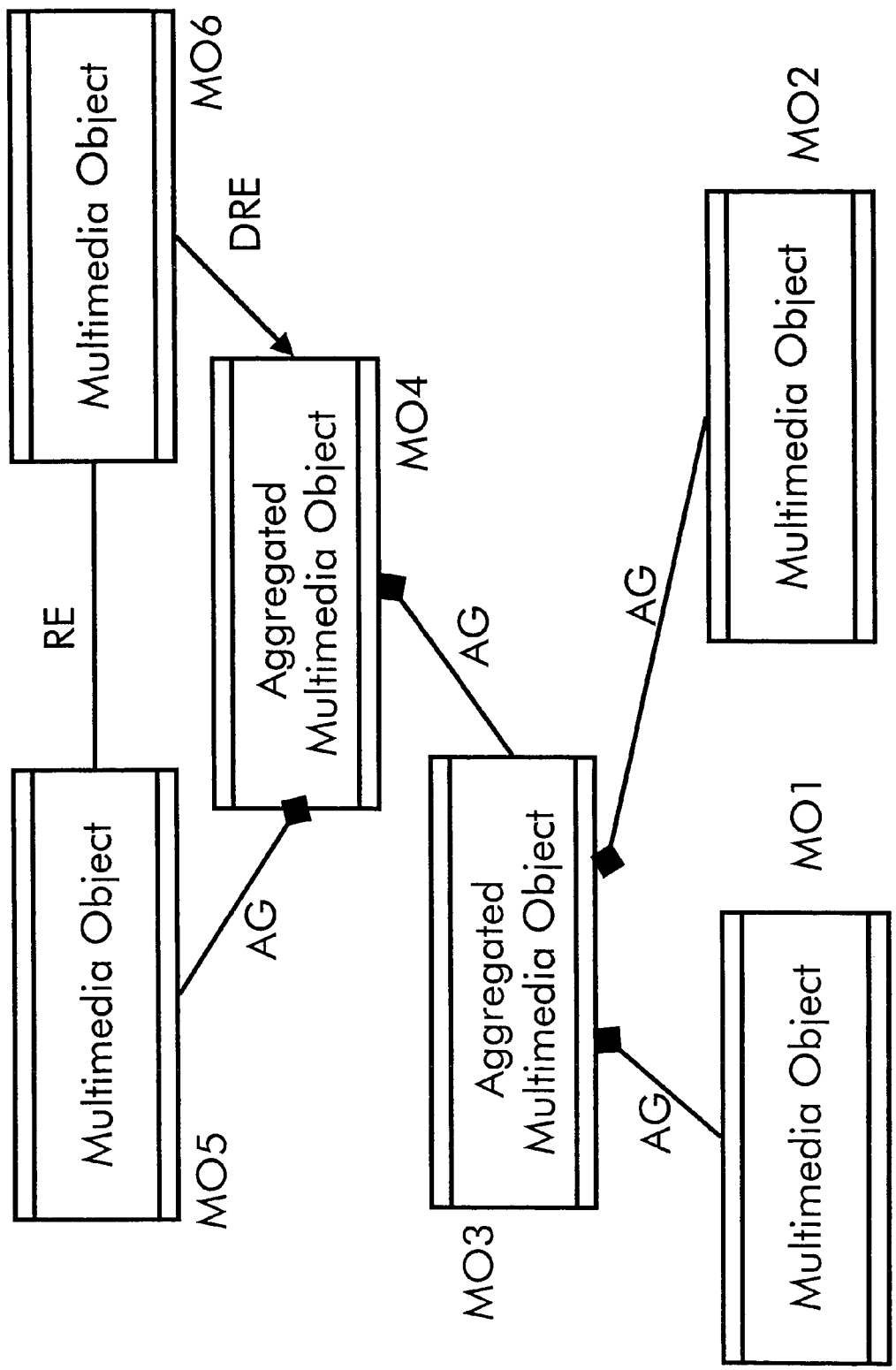
FIG. 9 shows a hypermedia description according to the invention.

FIG. 9 shows a hypermedia model formulated e.g. in a hypermedia description according to the invention in unified modeling language. The model comprises relations AG, RE, and DRE between multiple multimedia objects MO1, MO2, ... MO6. Some multimedia objects are aggregated multimedia objects MO3 and MO4. The relation types might be is-aggregated AG, is-contained AG, is-alternative RE, isreferred DRE, etc. Note that the multimedia objects MO1, MO2, ... MO6 are instances from the multimedia object 7 in FIG. 1 and are uniformly handled. Thus they could even be temporal, as shown in FIG. 1.

Figure 10:
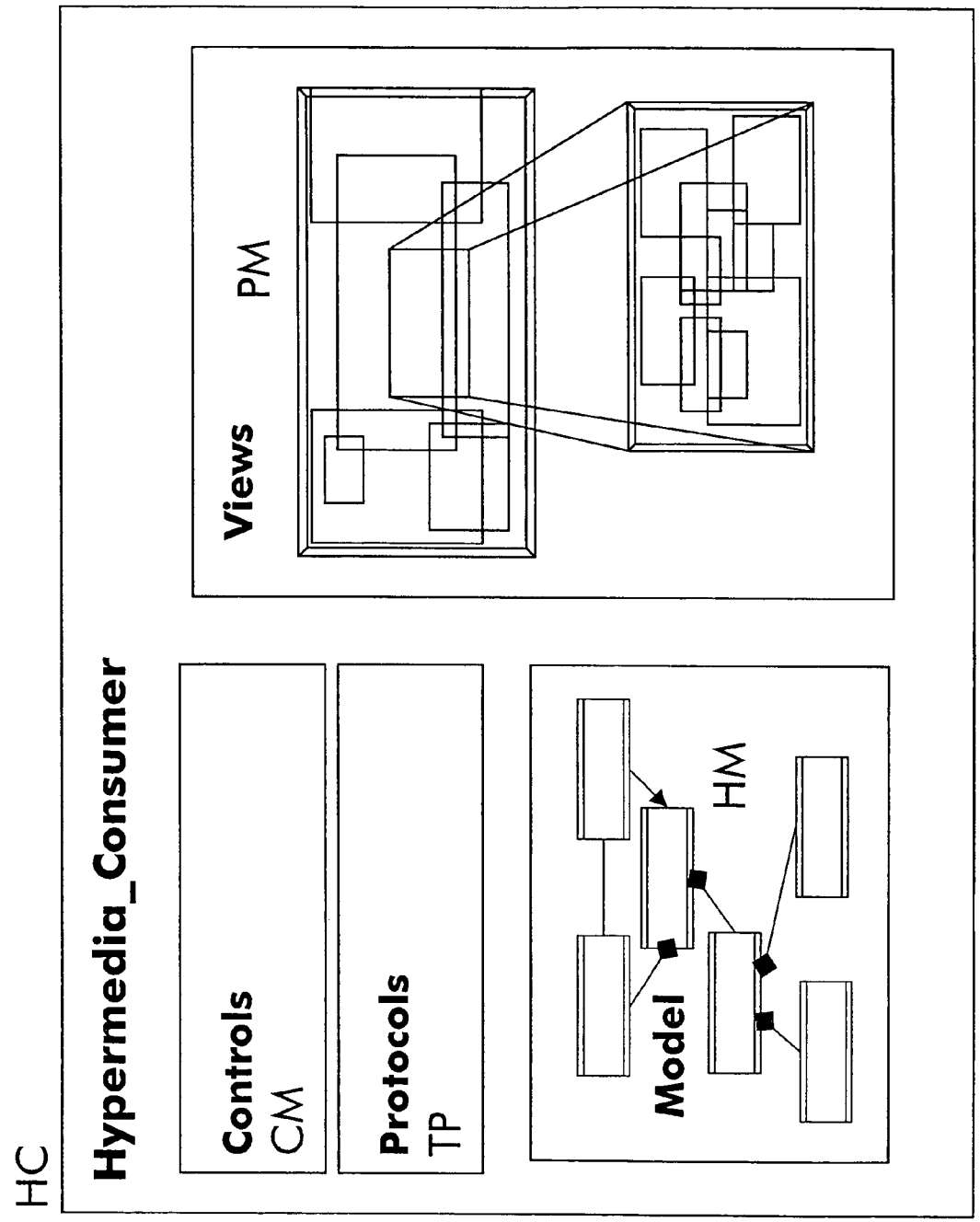
FIG. 10 shows a hypermedia client according to the invention.

FIG. 10 shows a hypermedia client according to the invention. The hypermedia client's user interface comprises presentation means PM for presenting the current hypermedia model HM, and control means CM for enabling the user interaction means for spawning linked, referred, detail, or alternative hypermedia objects etc., for changing size scale, resolution, perspective, source, time scale etc.

for hiding, showing, or navigating through referred objects or integrated objects etc.

The control means drives the corresponding presentation of a plurality of multimedia-hypermedia objects as well as stimulates the transfer protocol machine TP for communicating with the hypermedia server(s).

Figure 11:
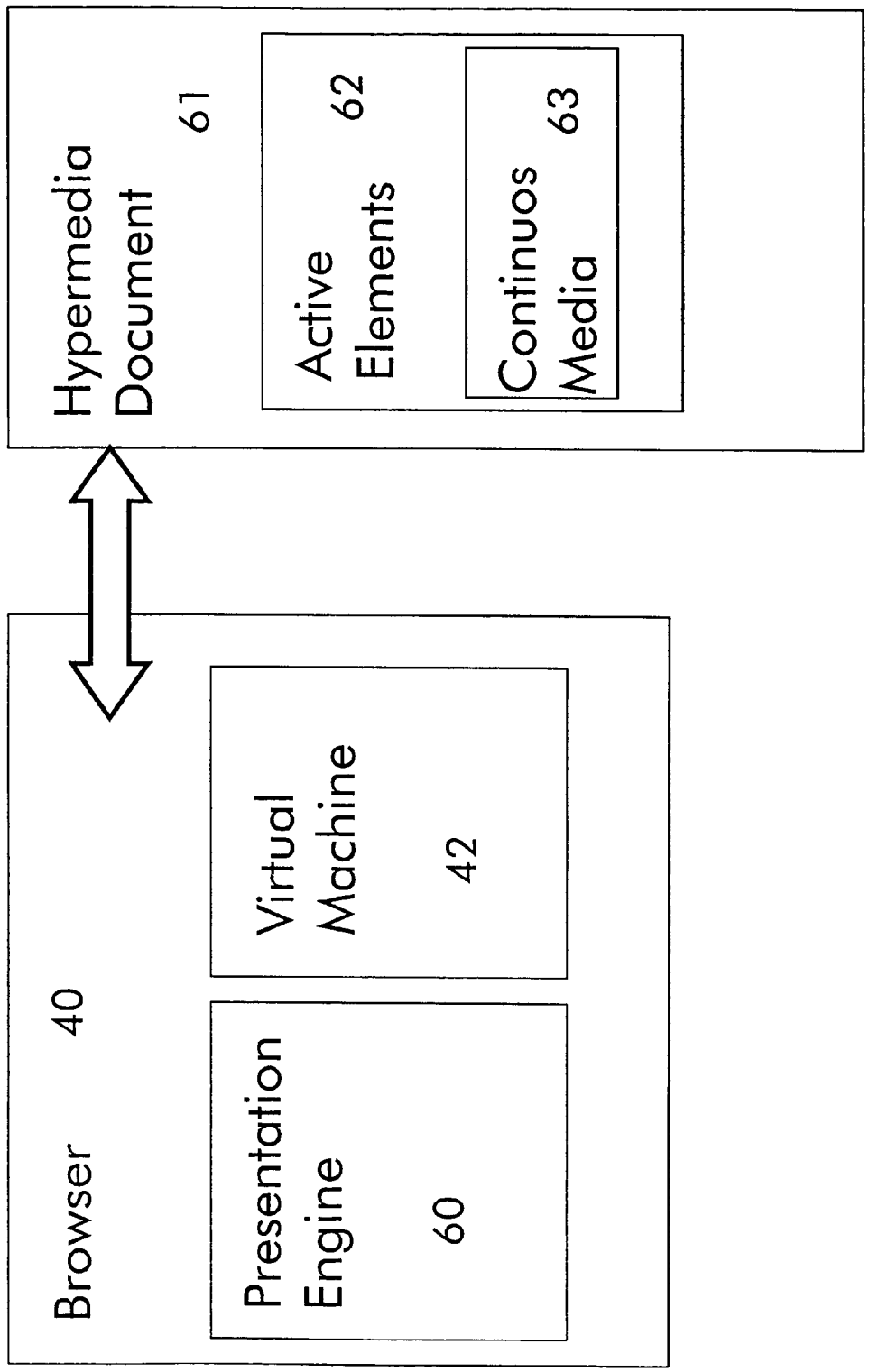
FIG. 11 shows the embedding of a presentation engine into hypermedia client according to the invention, as well as the embedding of the temporal hypermedia objects in the hypermedia description according to the invention.

FIG. 11 shows a revised version of the browser embedding shown in FIG. 6, now realizing a hypermedia client according to the invention. A browser 40 has an integrated presentation engine 60 and a virtual machine 42. A hypermedia document 61 comprises active elements 62 and among them also temporal (continuous) media 63. The hypermedia document is now uniformly integrated.

Figure 12:
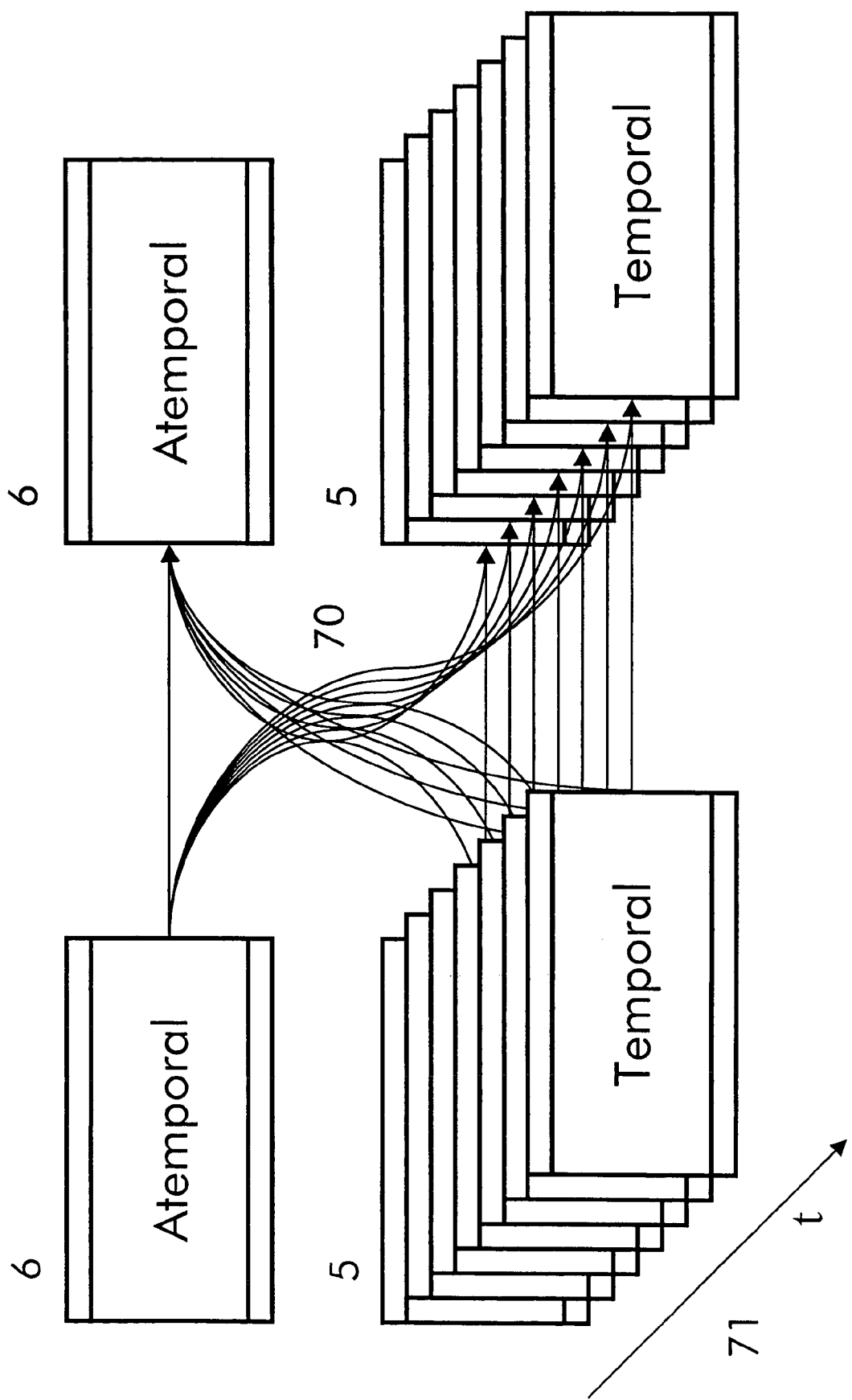
FIG. 12 shows a hypermedia transition model enabled by the hypermedia description according to the invention.

FIG. 12 shows the inter-relating structure that is enabled by the hypermedia document integration shown in FIG. 9. An atemporal object 6 as well as a temporal hypermedia object 6 can refer and can be referred, as illustrated by the sheaf of arrows 70, by a temporal object 5 or an atemporal hypermedia object 6. The diagonal time axes 71 illustrate the evolution of the temporal objects with their relationships.

Figure 13:
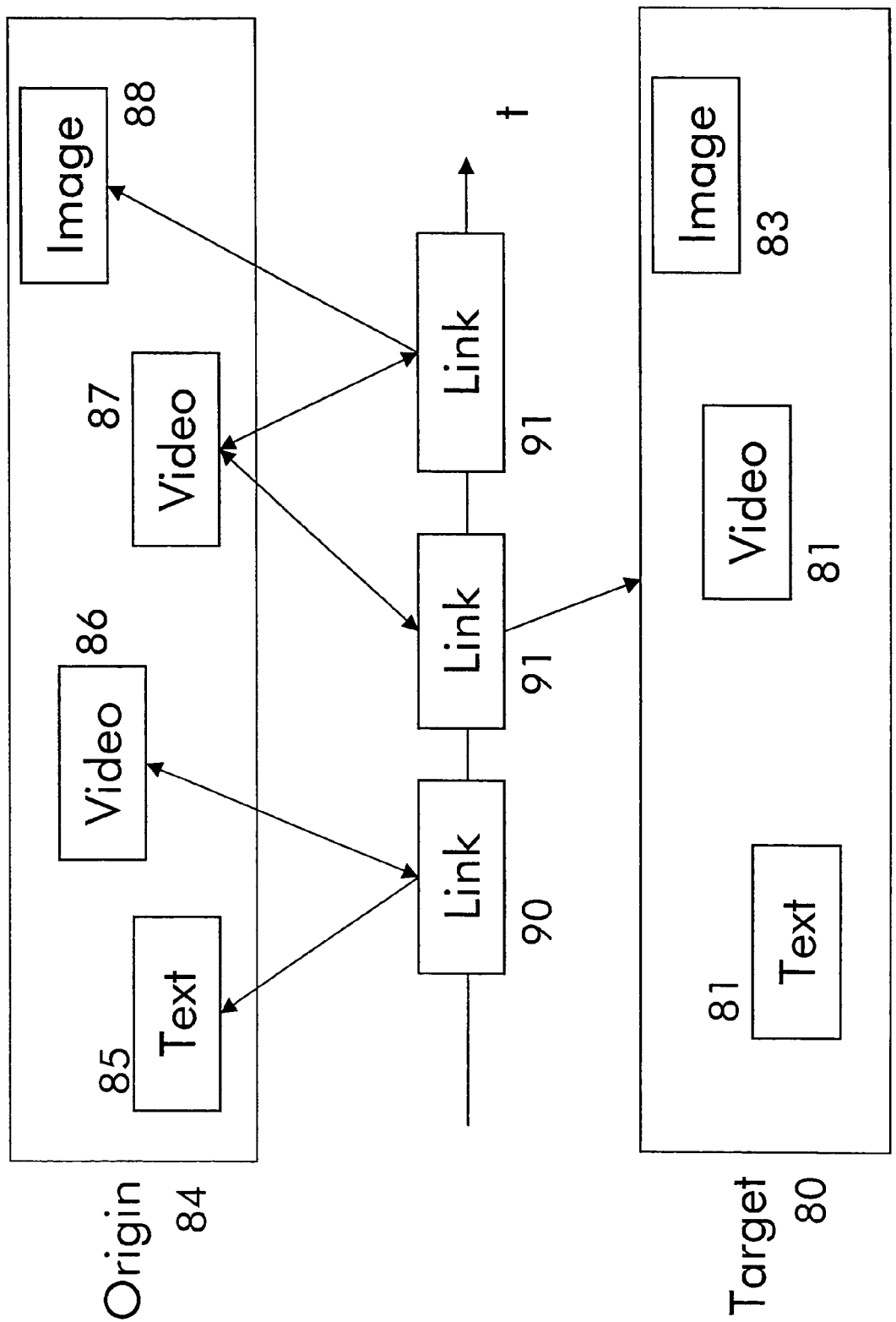
FIG. 13 shows an evolving relation structure enabled by the hypermedia description according to the invention.

FIG. 13 shows two hyper-linked hypermedia objects 80 and 84. The referred (target) hypermedia object consists of three hypermedia objects 81, 82, 83. The referring hypermedia object consists of four hypermedia objects, a text hypermedia object 85, a first video hypermedia object 86, a second video hypermedia object 87, and an image hypermedia object 88. The text hypermedia object 85 is linked with the first video hypermedia object 86 for a first time via the link object 90. A second link object relates the second video hypermedia object 87 with the referred hypermedia object 80. The second video hypermedia object 87 is also inter-linked with the image hypermedia object 88 via a third link object 92.

The figure illustrates that relations like hyper links now evolve not only with respect to referred content but also consist of a temporal dimension. The links or in general the relations have a lifetime and might evolve in their lifetime.

Figure 14:
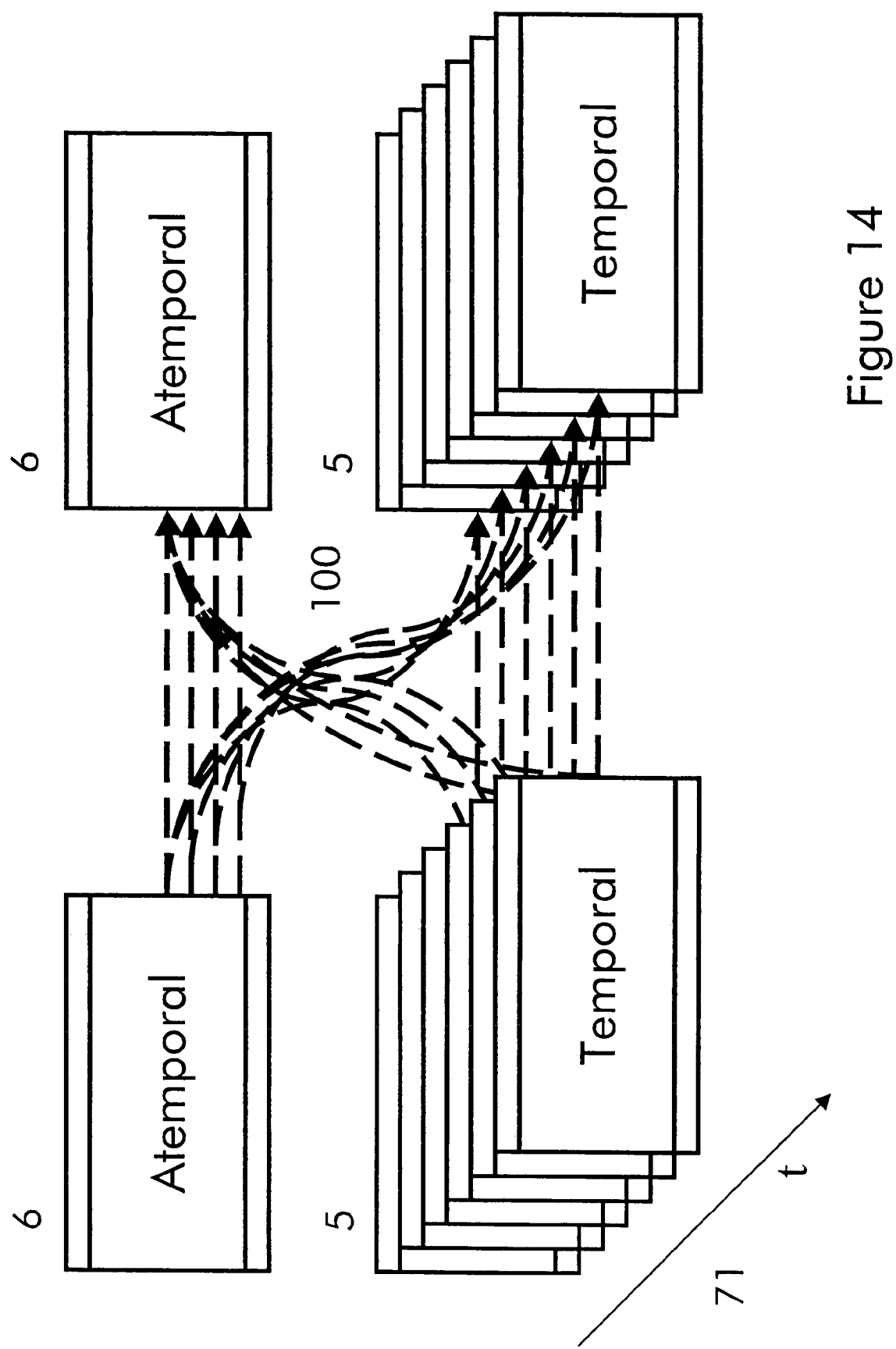
FIG. 14 shows a hypermedia transition model with evolving relation structure enabled by the hypermedia description according to the invention.

FIG. 14 shows an evolving inter-relating structure. The difference to the persistent inter-relating structure shown in FIG. 12 is that now the relations can change while time is going on. This is illustrated by the inhomogeneous sheaf of dashed arrows 100.

Concerning for instance hyper-video as a basic temporal media. Its basic unit might be a simple frame. A set of frames creates a strand, a set of strands creates a take and a set of takes tied together by synchronization (time) information creates a scene.

Any form of information that is manipulated by multimedia systems and can be broken down into frames (e.g., audio, video, control information for servo systems and mechanical actuators, etc.).

A strand is an immutable sequence of ordered frames. The immutability of strands means that the frames inside a strand can not be referenced as stand-alone entities from the outside. Operations on strands might be playback (which include fast forward and rewind, etc.), record, set and reset the reference etc.

A take is a collection of strands. The collection is ordered and the order of the composing strands is fixed. It might have a meta-data attribute, i.e. additional information. A scene is a collection of multiple takes (of the same or different medium) tied together by synchronization information. Synchronization could be either forced (by means of a clocking device) based on any discrete or real time model or automatically based on events.

A (hyper-) link or reference is a discrete function that formalizes the relationships between objects of the algebra. Discrete means that the function values are references to individual objects, i.e. to the information context. A link is either dynamic or static, i.e. the value also called target, is either time dependent or time-independent.

A composite object is a hierarchy of objects tied together by relations, hence a multimedia document is a composite object as well. Dynamic links include a temporal dimension. They parameterize the relationships between objects by contents and time. Static links are a specialization of dynamic links, where the space is atemporal and the transition depends just on contents.

A document set containing just static links is organized like a graph of nodes and edges. Each node has a coordinate on the contents axis. A static link between two objects establishes a connection between their corresponding coordinates.

However, if dynamic links are also present, this model can not represent the additional dimension, time.

A multimedia document with dynamic and static links can be represented as graph parameterized in time. That means the nodes are morphing in time. In the case of dynamic links, nodes store the information corresponding to the additional dimension (time) and represent points in a 2-dimensional space. The structure with uni-dimensional nodes is compatible only with static links and can not express the temporal information required by dynamic links. For a given object, they determine the complete hierarchy of associated objects, allowing for resource allocation and reservation, pre-fetching and caching.

Structuring the media not only offers a high-level abstraction for the raw data, but also allows for good performance from a low-level storage perspective.

Hyper-media document management operations might include basic operations for manipulating strands, such as Record, Playback, Stop, Fast Forward and Fast Rewind. They also include operations to establish or remove links associated with a certain strand.

The entities available at the application level are temporal and atemporal multimedia objects. Applications allow operations such as creation, composition and presentation. A document (a set of objects and a set of links relationships between them) can also be regarded as a relational structure. Therefore, support for content-based access operations is intrinsic. The entity types correspond to each object's media data and the meta-data associated with it.

The system should actively enable clients/users to customize the body of video information, like time and location perspective and scale as well as following hyperlinks/references. The system provides high level interface blocks with store and retrieval facilities for multimedia hypermedia objects, handling a temporal object as a container of objects, distributed over a communication network.

A basic scenario might be set of mobile devices (equipped with cameras) recording (synchronized) a scene and provide the motion pictures to (a set of) video server. The server(s)

integrate(s) the scene by integrating the single motion pictures (e.g. by generating a 3D model, promising a perspective menus or a source menu, or detail drill down, etc.), e.g. on a client's demand and allow a client to access the integrated data efficiently via inter-linked uniform motion picture object resources.

Nearly all application's domains making today use of multimedia will benefit from this invention, e.g. architecture, real estate, and interior design, broadcast media selection, education, cultural services like digital libraries, e-commerce, surveillance, remote sensing, multimedia directory services etc.

What is claimed is:

1. A method for a hypermedia communication system comprising the steps of:
   generating a hypermedia document by presenting the hypermedia document in a hypermedia description at a hypermedia server;
   requesting the hypermedia document at a hypermedia client;
   deploying the hypermedia description from the hypermedia server to said hypermedia client; and
   presenting the hypermedia document by translating the hypermedia description,
   wherein said hypermedia description comprising first expression means for a first reference from an atemporal hypermedia object to a first referred hypermedia object, and second expression means for a second reference from a temporal hypermedia object to a second referred hypermedia object,
   wherein the temporal hypermedia object comprises a plurality of elements that change on a time axis,
   wherein the second reference comprises references with respect to each of the plurality of elements of the temporal hypermedia object, and
   wherein said method comprises the steps of generating, requesting, deploying, and presenting hypermedia document uniformly,
   wherein at least one of the first and second references is a hyperlink to the first and second referred hypermedia objects, respectively,
   wherein the temporal hypermedia object comprises a video, and wherein each of the plurality of elements is a strand and comprises a plurality of frames.

2. The method according to claim 1, wherein at least one of the first and second references triggers further requesting, deploying, composing and presenting of the first and second referred hypermedia objects, respectively.

3. The method according to claim 1, wherein at least one of the first and the second referred hypermedia objects is an alternative hypermedia object for the temporal hypermedia object.

4. The method according to claim 1, wherein at least one of the first and the second references is temporally changed.

5. The method according to claim 1, wherein the references with respect to each of the plurality of elements of the temporal hypermedia object are temporally changed.

* * * * *

UNITED STATES PATENT AND TRADEMARK OFFICE
CERTIFICATE OF CORRECTION

PATENT NO. : 7,594,164 B2 Page 1 of 1
APPLICATION NO. : 10/893296
DATED : September 22, 2009
INVENTOR(S) : Hoche et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1179 days.

Signed and Sealed this

Twenty-eighth Day of September, 2010

David J. Kappos
*Director of the United States Patent and Trademark Office*